United States Patent [19]

Watanabe et al.

[11] Patent Number: 4,925,816

[45] Date of Patent: May 15, 1990

[54] NOVEL SOLID SOLUTION, HEAT-RESISTANT SINTERED BODY AND METHOD OF PRODUCING THE SAME

[75] Inventors: Keiichiro Watanabe; Tsuneaki Ohashi, both of Nagoya; Tadaaki Matsuhisa, Kasugai, all of Japan

[73] Assignee: NGK Insulators, Ltd., Japan

[21] Appl. No.: 232,667

[22] Filed: Aug. 16, 1988

[30] Foreign Application Priority Data

| Aug. 29, 1987 | [JP] | Japan | 62-215836 |
| May 16, 1988 | [JP] | Japan | 63-118926 |
| Jul. 28, 1988 | [JP] | Japan | 63-188798 |

[51] Int. Cl.$^5$ .............................. C04B 35/48
[52] U.S. Cl. .................... 501/104; 501/102; 501/103; 501/106; 423/306
[58] Field of Search ........... 501/102, 103, 104, 106; 423/306

[56] References Cited

U.S. PATENT DOCUMENTS

| 3,954,525 | 5/1976 | Myles et al. | 501/102 X |
| 4,247,249 | 1/1981 | Siemers | 501/102 X |
| 4,526,844 | 7/1985 | Yoldas et al. | 501/106 X |
| 4,587,172 | 5/1986 | Roy et al. | 501/102 X |
| 4,703,023 | 10/1987 | Yamai | 501/102 |

FOREIGN PATENT DOCUMENTS 8807028  9/1988  PCT Int'l Appl. .

OTHER PUBLICATIONS

Bergeron et al., *Introduction to Phase Equilibria in Ceramics,* (1984), pp. 32–38.

Limaye et al., "Synthesis and Thermal Expansion of MZr$_4$P$_6$O$_{24}$ (M=Mg, Ca, Sr, Ba)", J. Am. Cerm. Soc., vol. 70, No. 10, pp. 232–236, (1987).

Yamai et al., "Low-Thermal-Expansion Polycrystalline Zirconyl Phosphate Ceramic", J. Am. Cerm. Soc., vol. 68, No. 5, pp. 273–278, (1985).

*Primary Examiner*—Mark L. Bell
*Assistant Examiner*—Karl Group
*Attorney, Agent, or Firm*—Arnold, White & Durkee

[57] ABSTRACT

A novel solid solution has a composition of $R_y Zr_4 Si_x P_{6-x} O_{24}$ (R is at least one forming bivalent or trivalent element $0 \leq x \leq 2$, $\frac{2}{3} \leq y \leq 2$). Furthermore, a heat-resistant sintered body and heat-resistant phosphate based compound sintered body comprises the above solid solution and has excellent heat resistance and high temperature stability. And also, a method of producing such sintered bodies is disclosed.

8 Claims, 11 Drawing Sheets

FIG_1

FIG_2

FIG_3

FIG_6

FIG_8

FIG_10
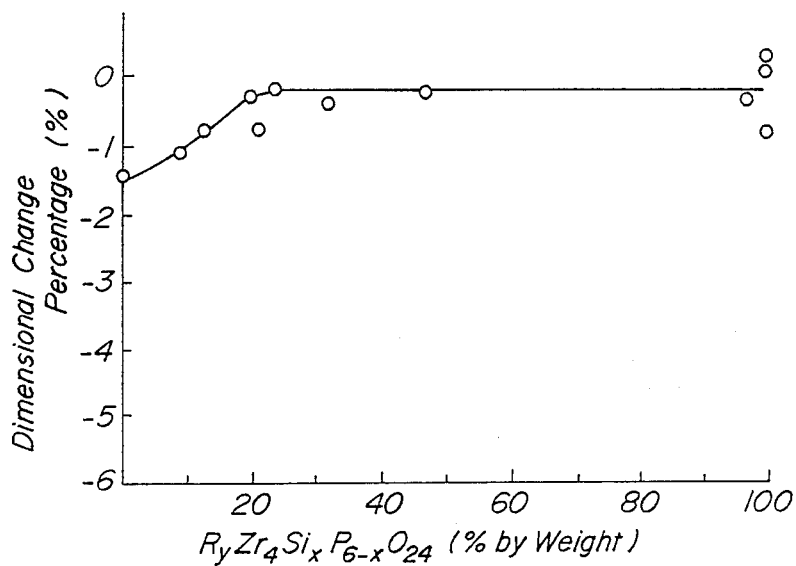
FIG_11
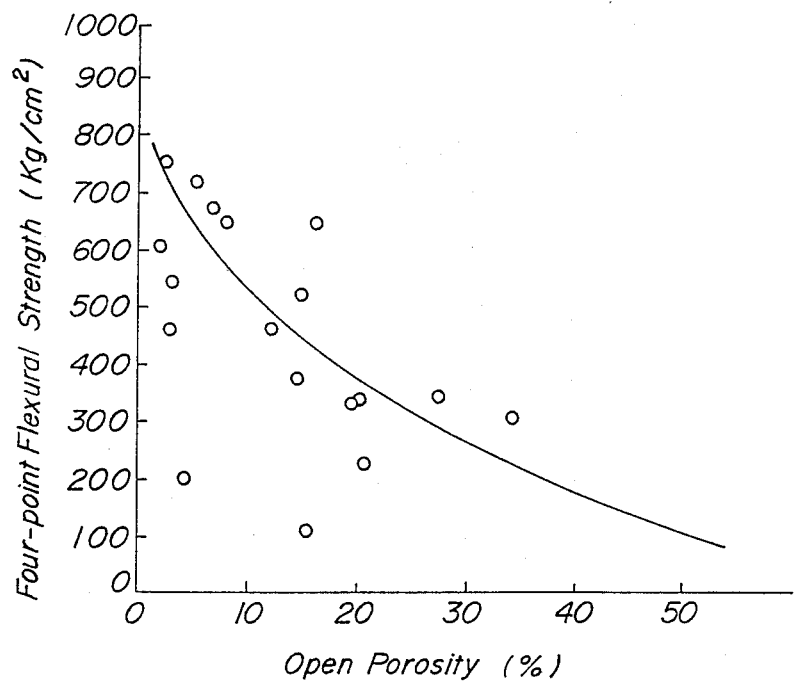

FIG_12
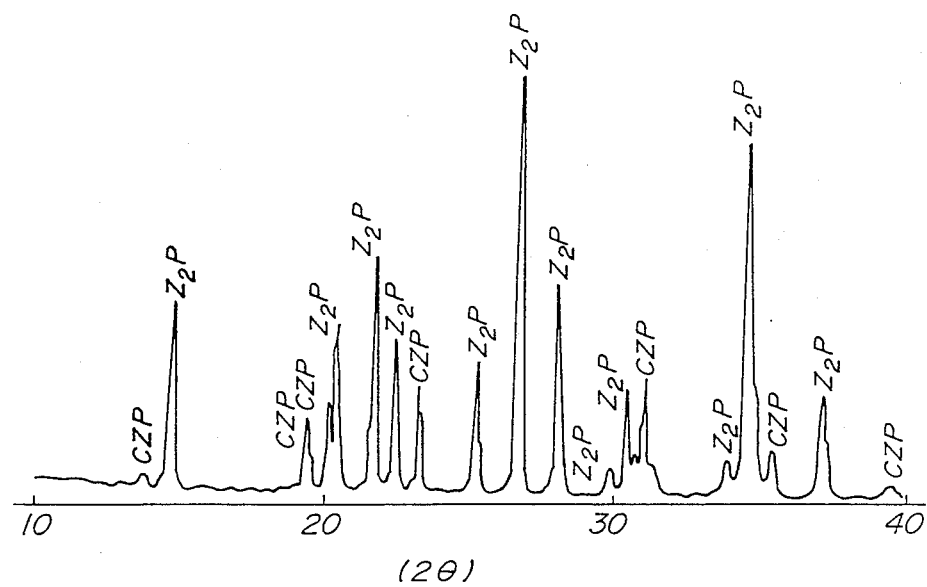
FIG_13
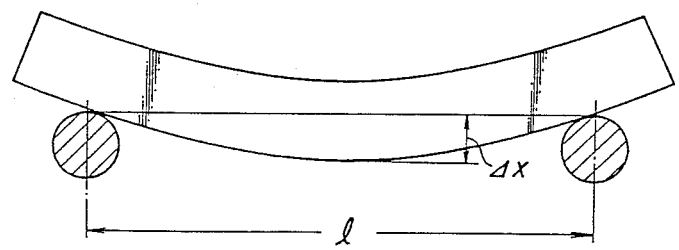

NOVEL SOLID SOLUTION, HEAT-RESISTANT SINTERED BODY AND METHOD OF PRODUCING THE SAME

BACKGROUND OF THE INVENTION

1. Field of the Invention

This invention relates to a solid solution of $R_yZr_4Si_xP_{6-x}O_{24}$ system (wherein R is at least one bivalent or trivalent element, x is a numerical value of 0 to 2, and y is a numerical value of ⅔ to 2 satisfying an electrically neutral condition of the chemical formula), a heat-resistant sintered body and a heat-resistant phosphate based compound sintered body each comprising the above solid solution, and a method of producing the same. More particularly, the present invention relates to a solid solution of $R_yZr_4Si_xP_{6-x}O_{24}$ system having excellent heat resistance and high temperature stability, a heat-resistant high strength sintered body comprising the above solid solution and having low expansion and improved high temperature stability, a phosphate based compound sintered body comprising the solid solution and having excellent heat resistance and high temperature stability and low expansion, and a method of producing the same.

RELATED ART STATEMENT

Recently, it has been strongly demanded to develop materials having excellent heat resistance and low expansion with the advance of industrial technologies.

Under such demands, it has been recognized that zirconyl phosphate [$(ZrO)_2P_2O_7$] is promising as a material having improved heat resistance and low expansion.

Lately, zirconium phosphates of alkali metals such as sodium and the like have been proposed as a material having good heat resistance and a low thermal expansion coefficient [Mat. Res. Bull., Vol. 19, pp. 1451–1456 (1984); Journal of Materials Science, 16, 1633–1642 (1981); and Yogyo Kyokai-shi, 95(5), pp. 531–537 (1987)].

Furthermore, phosphate compounds of alkaline earth metals having a particular composition are proposed to have a low expansion [Mat. Res. Bull, Vol. 20, pp. 99–106 (1985); and J. Am, Ceram. Soc., 70[10] C-232~C-236 (1987)].

Moreover, U.S. Pat. No. 4,675,302 discloses that ceramic materials having a basic composition of $Ca_{0.5}Ti_2P_3O_{12}$ are excellent in low expansion.

However, although the above phosphate compounds such as zirconyl phosphate and so on have a merit of excellent low expansion, these phosphate compounds have a common problem that they are thermally decomposed at high temperatures above 1,200° C. to evaporate the phosphorus component. For instance, when the heat treatment is carried out at 1,400° C. for 100 hours, zirconyl phosphate reduces the weight of the sintered body by 19%, while sodium zirconium phosphate reduces the weight of the sintered body by 36%.

Further, the ceramic material disclosed in U.S. Pat. No. 4,675,302 is mainly used as a substrate for a low expansion optical reflector in a man-made satellite causing no deformation or the like even under a temperature change. As shown in FIG. 2 of this patent, the temperature change is about 500° C. at most, so that there is no care on the stability, heat resistance and the like at an elevated temperature of, for example, not lower than 1,200° C.

The phosphate compounds of $CaZr_4P_6O_{24}$, $SrZr_4P_6O_{24}$, $BaZr_4P_6O_{24}$ and the like are excellent in high temperature stability as compared with zirconyl phosphate and their weight loss is not more than 10% after the heat treatment at 1,400° C. for 100 hours. However, $CaZr_4P_6O_{24}$ has a negative thermal expansion coefficient and is low in strength, while $SrZr_4P_6O_{24}$ has high strength but has a relatively high expansion owing to a thermal expansion coefficient of $25\times10^{-7}$/°C. Therefore, it is desired to develop heat resistant ceramics which have high strength and low expansion.

On the other hand, a method using a combination of substances selected from $Na_2CO_3$, $ZrO_2$, $ZrOCl_2\cdot8H_2O$, $SiO_2$, $(NH_4)_2HPO_4$, $H_3PO_4$, $Nb_2O_5$, $Y_2O_3$, $SrCO_3$, $K_2CO_3$, $CaCO_3$ and the like is known as a method for the production of a phosphate compound [T. Oota and I. Yamai, Journal of the American Ceramic Society, 69, 1, (1986)].

In this method, however, the $P_2O_5$ component is produced alone during the decomposition of ammonium phosphate or $H_3PO_4$ to locally form portions having a high phosphorus concentration, resulting in the formation of a low melting compound during sintering. Consequently, large pores (spaces) are formed in the sintered body, thereby causing serious defects.

SUMMARY OF THE INVENTION

The inventors have made various studies in order to solve the aforementioned problems of the conventional techniques and found that firing under an addition of a certain additive is effective for restraining the weight reduction due to the evaporation of the phosphorus component and in this case a given crystalline phase is formed in the sintered body. Furthermore, it has been found that the heat resistance and high temperature stability of the crystalline phase are excellent when R in the $R_yZr_4Si_xP_{6-x}O_{24}$ system is at least one bivalent or trivalent element such as Ca, Sr, Ba, Y or the like, and further various compounds of $R_yZr_4P_6O_{24}$ (⅔≦y≦1, and R is at least one bivalent or trivalent element) such as $CaZr_4P_6O_{24}$, $SrZr_4P_6O_{24}$, $BaZr_4P_6O_{24}$ and the like form a whole solid solution, and also high strength and low expansion sintered bodies having heat resistance and high temperature stability can be obtained by controlling the properties of $R_yZr_4P_6O_{24}$ itself such as thermal expansion behavior, thermal properties and the like through solid solubilization. In addition, it has been found that it is possible to form a solid solution wherein a part of the P ion is simultaneously replaced with an Si ion and an R ion as shown in the following reaction formula (1):

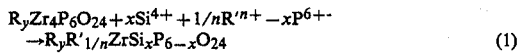

$$R_yZr_4P_6O_{24}+xSi^{4+}+1/nR'^{n+}-xP^{6+}$$
$$\rightarrow R_yR'_{1/n}ZrSi_xP_{6-x}O_{24} \qquad (1)$$

(where n is a valance number of R), and heat-resistant low expansion materials having high heat resistance and high strength and high temperature stability can be obtained by controlling the properties of $R_yZr_4Si_xP_{6-x}O_{24}$ itself such as thermal expansion behavior, thermal properties and the like through solid solubilization. As a result, the invention has been accomplished.

That is, the invention provides a solid solution having a composition of $R_yZr_4Si_xP_{6-x}O_{24}$, wherein R is at least one bivalent or trivalent element, x is a numerical value of 0 to 2; and y is a numerical value of ⅔ to 2 satisfying an electrically neutral condition of the chemical formula, a heat-resistant sintered body comprising the above solid solution; a heat-resistant phosphate based compound sintered body containing not less than 10% by weight of the above solid solution and having a weight-reduced percentage of not more than 10% after the heat treatment at 1,400° C. for 100 hours; a method of producing a heat-resistant sintered body comprising a solid solution of $R_yZr_4Si_xP_{6-x}O_{24}$ system, which comprises molding and firing a batch mixture of materials selected from $ZrP_2O_7$, $(ZrO)_2P_2O_7$, $ZrO_2$, $Zr(OH)_4$, $ZrSiO_4$, $SiO_2$, a phosphate of R, a silicate of R, and RO (R is an element capable of forming bivalent or trivalent cation); and a method of producing a heat-resistant phosphate based compound sintered body, which comprises molding and firing a batch mixture of materials selected from $ZrP_2O_7$, $(ZrO)_2P_2O_7$, $ZrO_2$, $ZrSiO_4$, $SiO_2$, a phosphate of R, a silicate of R, and RO (R is an element capable of forming a bivalent or trivalent cation).

BRIEF DESCRIPTION OF THE DRAWINGS

The invention will be described with reference to the accompanying drawings, wherein:

FIG. 10 is a graph showing a relationship between amount of $R_yZr_4Si_xP_{6-x}O_{24}$ crystalline phase in the phosphate based compound sintered body and dimensional change percentage in the heat treatment at 1,400° C. for 100 hours;

FIG. 11 is a graph showing a relationship between open porosity and four-point flexural strength in the phosphate based compound sintered body;

FIG. 12 is a graph showing an X-ray diffraction pattern in the phosphate compound of Example 33; and FIG. 13 is a view illustrating a method of measuring a self-weight softening percentage.

DESCRIPTION OF THE PREFERRED EMBODIMENTS

Figure 1:
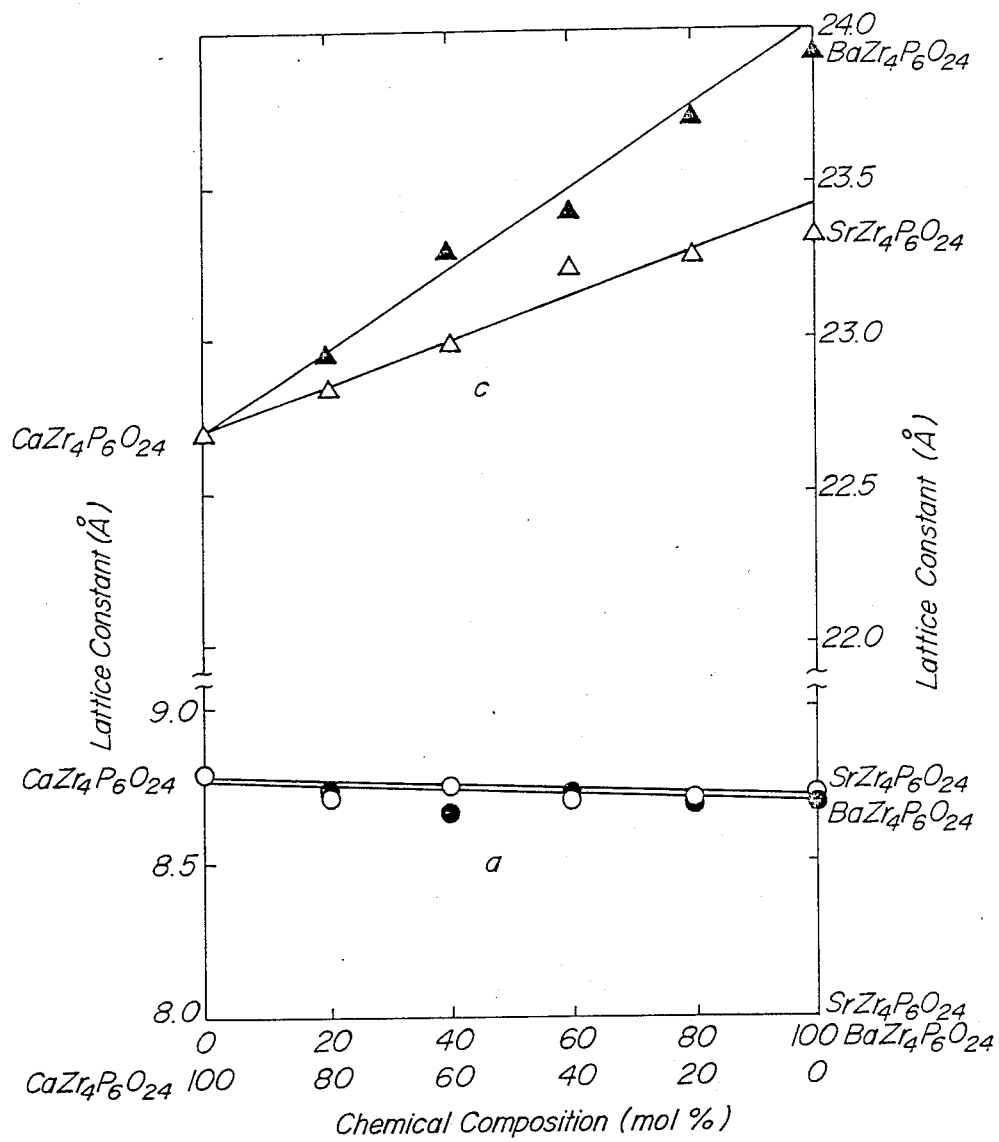
FIG. 1 is a graph showing a relationship between chemical composition and lattice constant in solid solutions of the $CaZr_4P_6O_{24}$—$SrZr_4P_6O_{24}$ system and the $CaZr_4P_6O_{24}$—$BaZr_4P_6O_{24}$ system.

The solid solution of the $R_yZr_4Si_xP_{6-x}O_{24}$ system according to the invention can be used not only as a sintered body alone but also as a compound constituting a composite body with a heat-resistant compound such as zircon, zirconia or the like.

In the solid solution of $R_yZr_4Si_xP_{6-x}O_{24}$ system according to the invention, it is necessary that R is at least one bivalent or trivalent element, and x is a numerical value of 0 to 2, and y is a numerical value of $\frac{2}{3}$ to 2. Particularly, R is at least one element in Group IIa of the Periodic Table, (for example, barium (Ba), strontium (Sr) and calcium (Ca)). When R contains a monovalent cation, the high temperature stability is poor, while when x is more than 2, the heat resistance is poor.

When the above system satisfies the aforementioned requirements, a solid solution having improved heat resistance and high temperature stability, and a sintered body comprising this solid solution, are obtained.

In the phosphate based compound sintered body according to the invention, it is necessary to include a substance having the general formula of $R_yZr_4Si_xP_{6-x}O_{24}$ as a crystalline phase. The heat stability at high temperature becomes largely different due to the presence or absence of this crystalline phase as mentioned later.

According to the sintered body of the invention, the weight-reduced percentage due to the evaporation of phosphorus component and the four-point flexural strength can be made to not more than 10% and not less than 100 kg/cm² at an open porosity of not more than 50% after the heat treatment at 1,400° C. for 100 hours. That is, when the open porosity exceeds 50%, the four-point flexural strength becomes less than 100 kg/cm² and the strength required as a practical ceramic material is not satisfied. Furthermore, the self-weight softening percentage of the sintered body after the heat treatment at 1,400° C. for 5 hours is not more than 0.3%, which satisfies the requirement as a heat-resistant material.

Moreover, the above sintered body is small in dimensional change percentage. That is, the dimensional change percentage is not more than 1% after a heat treatment at 1,400° C. for 100 hours, which also satisfies the requirement as a heat-resistant material. And also, the thermal expansion coefficient of the sintered body over a temperature range of room temperature to 1,400° C. is as low as not higher than $25 \times 10^{-7}$/°C., which shows the excellent thermal shock resistance. Therefore, the sintered bodies according to the invention having the above properties are favorably applied to materials requiring the heat resistance and heat stability at high temperature such as ceramic honeycomb structural bodies, for instance, catalyst carrier for the purification of automobile exhaust gas and the like; rotary heat regenerating type ceramic heat exchangers, heat recuperative type ceramic heat exchangers, housings for a turbocharger rotor, heat insulation materials for an engine manifold, diesel particulate filters and so on.

In the method of producing the heat-resistant sintered body according to the invention, the starting material lies in a batch mixture of powdery materials selected from $ZrP_2O_7$, $(ZrO)_2P_2O_7$, $ZrO_2$, $Zr(OH)_4$, $ZrSiO_4$, $SiO_2$, a phosphate of R, a silicate of R and RO (R is at least one bivalent or trivalent element).

Furthermore, in the method of producing the phosphate based compound sintered body according to the invention, the starting material lies in a batch mixture of powdery materials selected from $ZrP_2O_7$, $(ZrO)_2P_2O_7$, $ZrO_2$, $ZrSiO_4$, $SiO_2$, a phosphate of R, a silicate of R and RO (R is at least one bivalent or trivalent element).

These powdery materials of $ZrP_2O_7$, $(ZrO)_2P_2O_7$, $ZrO_2$, $Zr(OH)_4$, $ZrSiO_4$, $SiO_2$, a phosphate of R, a silicate of R and RO are stable compounds and hardly produce the non-uniformity at the molding and firing step and are firable at the high temperature and can provide ceramics having excellent heat resistance.

On the other hand, if the conventionally used phosphoric acid is used as a $P_2O_5$ source, since phosphoric acid is liquid, non-uniformity is caused during the mixing to locally form portions having a high phosphorus concentration and to thereby produce a compound having a low melting point. Further, when the honeycomb structural body is obtained by extruding a body containing phosphoric acid, an extrusion die or a cylinder in an extruder rusts or corrodes due to corrosiveness of phosphoric acid, and consequently the extrusion molding becomes considerably difficult. Moreover, when such a body is used in the pressing, it is essentially impossible to mold the body as a powder due to the presence of phosphoric acid.

In the method of producing the heat-resistant sintered body according to the invention, the batch mixture usually comprises 0-82.9% by weight of $ZrP_2O_7$, 0-79.5% by weight of $(ZrO)_2P_2O_7$, 0-50.4% by weight of $ZrO_2$, 0-56.8% by weight of $Zr(OH)_4$, 0-38.0% by weight of $ZrSiO_4$, 0-12.5% by weight of $SiO_2$, 0-44.9% by weight of a phosphate of R, 0-35.5% by weight of a silicate of R, and 0-37.3% by weight of RO. In this case, it is necessary that the batch mixture contains at least one of $ZrP_2O_7$, $(ZrO)_2P_2O_7$ and the phosphate of R as well as RO, the silicate of R and the phosphate of R.

In the method of producing the heat-resistant phosphate based compound sintered body according to the invention, the batch mixture usually comprises 0-84.2% by weight of $ZrP_2O_7$, 0-82.3% by weight of $(ZrO)_2P_2O_7$, 0-51.7% by weight of $ZrO_2$, 0-77.2% by weight of $ZrSiO_4$, 0-37.8% by weight of $SiO_2$, 0-44.6% by weight of a phosphate of R, 0-53.0% by weight of a silicate of R, and 0-42.1% by weight of RO. In this case, it is necessary that the batch mixture contains at least one of $ZrP_2O_7$, $(ZrO)_2P_2O_7$ and the phosphate of R as well as RO, the silicate of R and the phosphate of R.

The RO as a starting component may be used by selecting from stable compounds such as hydroxides, carbonates, sulfates and the like converting into RO or an oxide during the firing.

Moreover, the starting material usually used has an average particle size of not more than 50 μm, preferably not more than 10 μm.

As the firing conditions for the sintered body according to the invention, the firing temperature is not lower than 1,400° C., preferably 1,400°–1,800° C., and the firing time is 1–24 hours, preferably 2–10 hours. When the firing temperature is restricted to not lower than 1,400° C., the phosphate based compound sintered body containing not less than 10% by weight of $R_yZr_4Si_xP_{6-x}O_{24}$ as a crystalline phase according to the invention can be obtained. Further, when the firing time is less than 1 hour, the sintering is insufficient, while when it exceeds 24 hours, the strength lowers due to abnormal grain growth and also the precipitate of a different phase occurs due to the evaporation of the phosphorus component.

As mentioned above, the preferred embodiments of the invention will be summarized as follows:

(a) a solid solution of $R_yZr_4P_6O_{24}$, wherein R is at least two bivalent or trivalent elements and y is a numerical value of ⅔ to 2 satisfying an electrically neutral condition of the chemical formula, and a heat-resistant sintered body and heat-resistant phosphate based compound sintered body comprising the above solid solution;

(b) a solid solution of $R_yZr_4Si_xP_{6-x}O_{24}$, wherein R is at least one element of Ba, Sr and Ca, and x is a numerical value of 0 to 2 and y is a numerical value of 1 to 2, and a heat-resistant sintered body and heat-resistant phosphate based compound sintered body comprising the above solid solution;

(c) a heat-resistant sintered body comprising a solid solution of the $R_yZr_4Si_xP_{6-x}O_{24}$ system and having a weight-reduced percentage of not more than 10% after a heat treatment at 1,400° C. for 100 hours;

(d) a heat-resistant sintered body and a heat-resistant phosphate based compound sintered body each comprising a solid solution of the $R_yZr_4Si_xP_{6-x}O_{24}$ system and having an open porosity of not more than 50% and a four-point flexural strength of 100 kg/cm²;

(e) a heat-resistant sintered body and a heat-resistant phosphate based compound sintered body each comprising a solid solution of $R_yZr_4Si_xP_{6-x}O_{24}$ system and having a self-weight softening percentage of not more than 0.3% after the heat treatment at 1,400° C. for 5 hours;

(f) a heat-resistant sintered body and a heat-resistant phosphate based compound sintered body each comprising a solid solution of the $R_yZr_4Si_xP_{6-x}O_{24}$ system and having a dimensional change percentage of not more than 1% after the heat treatment at 1,400° C. for 100 hours;

(g) a heat-resistant sintered body and a heat-resistant phosphate based compound sintered body each comprising a solid solution of the $R_yZr_4Si_xP_{6-x}O_{24}$ system and having a thermal expansion coefficient over a temperature range of room temperature to 1,400° C. of not higher than $25 \times 10^{-7}/°C.$;

(h) a heat-resistant sintered body and a heat-resistant phosphate based compound sintered body each comprising a solid solution of the $R_yZr_4Si_xP_{6-x}O_{24}$ system for use in a honeycomb structural body;

(i) a heat-resistant composite body containing a solid solution of the $R_yZr_4Si_xP_{6-x}O_{24}$ system as a main crystalline phase and a heat-resistant compound such as zircon, zirconia or the like as a second crystalline phase;

(j) a method of producing a heat-resistant sintered body and heat-resistant phosphate based compound sintered body comprising a solid solution of the $R_yZr_4Si_xP_{6-x}O_{24}$ system, wherein R is at least one element of Ba, Sr and Ca;

(k) a method of producing a heat-resistant sintered body and heat-resistant phosphate based compound sintered body comprising a solid solution of the $R_yZr_4Si_xP_{6-x}O_{24}$ system, wherein RO is selected from hydroxides, carbonates and sulfates converting into RO during the firing;

(l) a method of producing a heat-resistant sintered body and heat-resistant phosphate based compound sintered body comprising a solid solution of the $R_yZr_4Si_xP_{6-x}O_{24}$ system, wherein the firing temperature is not lower than 1,400° C. and the firing time is 1-24 hours.

The following examples are given in illustration of the invention and are not intended as limitations thereof.

According to a formulating recipe as shown in the following Tables 1 and 2 zirconyl phosphate [$(ZrO)_2P_2O_7$], $ZrP_2O_7$, calcium carbonate, strontium carbonate, barium carbonate, yttria, nickel oxide, zircon, sodium carbonate, ammonium dihydrogen phosphate, ceria, titania, silica, calcium phosphate and zirconia, which were previously adjusted to a given particle size, were mixed to form a mixture. In Comparative Example 25, a mixture shown in Table 1 was charged into an alumina crucible, held in an electric furnace in air at 1,000° C. for 12 hours and pulverized to form a batch mixture. The adjustment of grain size in zirconyl phosphate was carried out by using a vibration mill filled with pebbles of $ZrO_2$ sintered body having a diameter of about 5 mm, but it may be carried out in a pot mill or an attriter. The pebbles of $ZrO_2$ sintered body were used by stabilizing with MgO and $Y_2O_3$. The chemical composition of the pebble used is shown in the following Table 3. Further, the chemical analysis values of the starting materials used are shown in the following Table 4.

One hundred parts by weight of the batch mixture shown in Tables 1 and 2 was added and throughly mixed with 5 parts by weight of a 10% PVA aqueous solution, which was pressed in a mold of $25 \times 80 \times 6$ mm at a pressure of 100 kg/cm², rubber-pressed at a pressure of 2 tons/cm² and then dried. After the drying, the molded body was fired in an electric furnace in air under conditions shown in Tables 1 and 2. The heating rate was 5°-1,700° C./hr. After the firing, the resulting sintered body was worked into a test specimen of $3 \times 4 \times 40$ mm defined in JIS R1601 (1981), which was then measured with respect to weight-reduced percentage and dimensional change percentage after heat treatment at 1,400° C. for 100 hours, thermal expansion coefficient over a temperature range of room temperature (RT) to 1,400° C., four-point flexural strength, self-weight softening percentage, open porosity, and melting point. The measurement of the thermal expansion coefficient was carried out by means of a push rod type differential dilatometer using a high purity alumina sintered body over a measuring temperature range of room temperature to 1,400° C. The four-point flexural strength was measured according to a method shown in JIS R1601. The self-weight softening percentage was determined by the following equation through placing the above test specimen on supports at a span of 30 mm shown in FIG. 13, heat-treating it in air at 1,400° C. for 5 hours and measuring a self-weight deformation amount $\Delta x$:

Self-weight softening percentage $= \Delta x/l \times 100(\%)$

The open porosity was measured according to an Archemedian process. The melting point was determined by visually observing whether or not a cut sample of the sintered body of $3 \times 4 \times 5$ mm was melted by the heat treatment in an electric furnace at 1,700° C. for 10 minutes. Further, amounts of crystalline phases in the sintered body were quantitatively determined by using a reflection peak value at (200) plane of zirconyl phosphate ($\beta$-$(ZrO)_2P_2O_7$) [Communications of the American Ceramic Society, C-80(1984)], a reflection peak value at (113) plane of $R_yZr_4Si_xP_{6-x}O_{24}$ [after the index of the above crystalline phase composition was numbered according to JCPDS 33-321 of $CaZr_4(PO_4)_6$, JCPDS 33-1360 of $SrZr_4(PO_4)_6$ and JCPDS 34-95 of $BaZr_4(PO_4)_6$, a possible case for index numbering was judged to form a solid solution], a reflection peak value at (312) plane of JCPDS 6-266 of zircon, and a reflection peak value at (011) plane of JCPDS 34-95 of m-$ZrO_2$, provided that since a relative intensity of the reflection at (011) plane of m-$ZrO_2$ is as low as 18/100, a value of 5.6 times of the intensity was used as a peak value. With respect to the other different crystalline phases, presence or absence thereof was only identified by the X-ray diffraction pattern. The lattice constant of the solid solution was determined by calculating a and c according to the following simultaneous equations after interplanar spacings $d_{018}$ and $d_{208}$ were measured from a reflection peak angle $2\theta$ at (018) plane and a reflection peak angle at (208) plane of $R_yZr_4Si_xP_{6-x}O_{24}$:

$1/d^2_{018} = 4/3a^2 + 64/c^2$ $1/d^2_{208} = 16/3a^2 + 64/c^2$

TABLE 1(a)

| | Example | | | | | | |
|---|---|---|---|---|---|---|---|
| | 1 | 2 | 3 | 4 | 5 | 6 | 7 |
| Formulating proportions (wt %) | | | | | | | |
| $(ZrO)_2P_2O_7$ | 37.1 | 36.8 | 36.5 | 36.1 | 36.8 | 36.1 | 35.4 |
| $ZrP_2O_7$ | 52.3 | 51.8 | 51.3 | 50.9 | 51.8 | 50.8 | 49.9 |
| $CaCO_3$ | 7.7 | 5.7 | 3.8 | 1.9 | 7.5 | 5.6 | 3.7 |
| $SrCO_3$ | 2.9 | 5.7 | 0.4 | 11.1 | | | |
| $BaCO_3$ | | | | | 3.8 | 7.5 | 11.0 |
| $ZrO_2$ | | | | | | | |
| $Ca_3P_2O_8$ | | | | | | | |
| NiO | | | | | | | |
| $Y_2O_3$ | | | | | | | |
| $SiO_2$ | | | | | | | |
| Chemical composition (mol %) | | | | | | | |
| $CaZr_4P_6O_{24}$ | 80 | 60 | 40 | 20 | 80 | 60 | 40 |
| $SrZr_4P_6O_{24}$ | 20 | 40 | 60 | 80 | | | |
| $BaZr_4P_6O_{24}$ | | | | | 20 | 40 | 60 |
| $NiZr_4P_6O_{24}$ | | | | | | | |

TABLE 1(a)-continued

| | Example | | | | | | |
|---|---|---|---|---|---|---|---|
| | 1 | 2 | 3 | 4 | 5 | 6 | 7 |
| $Y_{2/3}Zr_4P_6O_{24}$ | | | | | | | |
| $Sr_4Zr_4Si_6O_{24}$ | | | | | | | |
| $Ba_4Zr_4Si_6O_{24}$ | | | | | | | |
| Crystalline phase main crystalline phase | $CaZr_4P_6O_{24}$ -$SrZr_4P_6O_{24}$ solid solution | $CaZr_4P_6O_{24}$ -$BaZr_4P_6O_{24}$ solid solution | $CaZr_4P_6O_{24}$ -$BaZr_4P_6O_{24}$ solid solution | $CaZr_4P_6O_{24}$ -$BaZr_4P_6O_{24}$ solid solution | $CaZr_4P_6O_{24}$ -$BaZr_4P_6O_{24}$ solid solution | $SrZr_4P_6O_{24}$ -$BaZr_4P_6O_{24}$ solid solution | $SrZr_4P_6O_{24}$ -$BaZr_4P_6O_{24}$ solid solution |
| second crystalline phase | — | — | — | — | — | — | — |

TABLE 1(b)

| | Example | | | | | | |
|---|---|---|---|---|---|---|---|
| | 1 | 2 | 3 | 4 | 5 | 6 | 7 |
| Lattice constant of crystalline phase a (Å) | 8.73 | 8.75 | 8.71 | 8.71 | 8.75 | 8.67 | 8.73 |
| c (Å) | 22.86 | 23.00 | 23.25 | 23.29 | 22.96 | 23.31 | 23.42 |
| Firing conditions firing temperature (°C.) | 1,600 | 1,600 | 1,600 | 1,600 | 1,600 | 1,600 | 1,600 |
| keeping time (h) | 5 | 5 | 5 | 5 | 5 | 5 | 5 |
| Firing shrinkage (%) | 10.6 | 16.2 | 16.8 | 16.7 | 14.7 | 14.3 | 13.8 |
| Characteristics of sintered body | | | | | | | |
| open porosity (%) | 16.3 | 14.8 | 11.9 | 14.0 | 15.6 | 14.0 | 15.7 |
| four-point bending strength (kg/cm$^2$) | 250 | 520 | 660 | 720 | 170 | 370 | 570 |
| weight-reduced percentage (%, 1400° C. × 100 h) | 1.2 | 1.0 | 0.9 | 0.6 | 2.4 | 2.1 | 1.7 |
| dimensional change percentage (%, 1400° C. × 100 h) | −0.8 | −0.96 | −0.9 | −0.8 | −0.7 | −0.96 | −0.7 |
| self-weight softening percentage (%, 1400° C. × 5 h) | 0.03 | 0.02 | 0.02 | 0.01 | 0.03 | 0.01 | 0.01 |
| thermal expansion coefficient (×10$^{-7}$/°C., RT-1400° C.) | −3 | 13 | 21 | 24 | −8 | 8 | 19 |
| melting point (°C.) | >1,700 | >1,700 | >1,700 | >1,700 | >1,700 | >1,700 | >1,700 |

TABLE 1(c)

| | Example | | | | | | |
|---|---|---|---|---|---|---|---|
| | 8 | 9 | 10 | 11 | 12 | 13 | 14 |
| Formulating proportions (wt %) | | | | | | | |
| $(ZrO)_2P_2O_7$ | 34.8 | | 43.9 | 37.1 | 34.5 | 34.8 | |
| $ZrP_2O_7$ | 49.0 | 73.7 | 42.8 | 52.3 | 48.6 | 49.0 | 78.2 |
| $CaCO_3$ | 1.8 | | | 7.7 | | 1.8 | |
| $SrCO_3$ | | 6.7 | 3.5 | 2.9 | 2.6 | | 7.1 |
| $BaCO_3$ | 14.4 | 9.1 | 4.8 | | 14.3 | 14.4 | |
| $ZrO_2$ | | 10.5 | | | | | 11.1 |
| $Ca_3P_2O_8$ | | | 5.0 | | | | |
| NiO | | | | | | | 3.6 |
| $Y_2O_3$ | | | | | | | |
| $SiO_2$ | | | | | | | |
| Chemical composition (mol %) | | | | | | | |
| $CaZr_4P_6O_{24}$ | 20 | | 50 | 80 | | 20 | |
| $SrZr_4P_6O_{24}$ | | 50 | 25 | 20 | 20 | | 50 |
| $BaZr_4P_6O_{24}$ | 80 | 50 | 25 | | 80 | 80 | |
| $NiZr_4P_6O_{24}$ | | | | | | | 50 |
| $Y_{2/3}Zr_4P_6O_{24}$ | | | | | | | |
| $Sr_4Zr_4Si_6O_{24}$ | | | | | | | |
| $Ba_4Zr_4Si_6O_{24}$ | | | | | | | |
| Crystalline phase main crystalline phase | $CaZr_4P_6O_{24}$ -$BaZr_4P_6O_{24}$ solid solution | $SrZr_4P_6O_{24}$ -$BaZr_4P_6O_{24}$ solid solution | $CaZr_4P_6O_{24}$ -$SrZr_4P_6O_{24}$ $BaZr_4P_6O_{24}$ solid solution | $CaZr_4P_6O_{24}$ -$SrZr_4P_6O_{24}$ solid solution | $SrZr_4P_6O_{24}$ -$BaZr_4P_6O_{24}$ solid solution | $CaZr_4P_6O_{24}$ -$BaZr_4P_6O_{24}$ solid solution | $SrZr_4P_6O_{24}$ -$NiZr_4P_6O_{24}$ solid solution |
| second crystalline phase | — | — | — | — | — | — | $ZrP_2O_7$ |

TABLE 1(d)

| | Example | | | | | | |
|---|---|---|---|---|---|---|---|
| | 8 | 9 | 10 | 11 | 12 | 13 | 14 |
| Lattice constant of crystalline phase a (Å) | 8.70 | 8.70 | 8.68 | 8.74 | 8.72 | — | 8.74 |
| c (Å) | 23.72 | 23.69 | 22.91 | 22.85 | 23.81 | — | 23.28 |
| Firing conditions firing temperature (°C.) | 1,600 | 1,600 | 1,600 | 1,400 | 1,800 | 1,800 | 1,400 |
| keeping time (h) | 5 | 5 | 5 | 24 | 1 | 1 | 1 |

TABLE 1(d)-continued

| | Example | | | | | | |
|---|---|---|---|---|---|---|---|
| | 8 | 9 | 10 | 11 | 12 | 13 | 14 |
| Firing shrinkage (%) | 14.1 | 10.0 | 17.2 | 7.2 | 15 | 20.7 | 23.1 |
| Characteristics of sintered body | | | | | | | |
| open porosity (%) | 13.8 | 20.2 | 12.0 | 18.1 | 14.9 | 5.0 | 5.4 |
| four-point bending strength (kg/cm$^2$) | 580 | 320 | 460 | 300 | 410 | 650 | 280 |
| weight-reduced percentage (%, 1400° C. × 100 h) | 1.7 | 1.6 | 2.3 | 1.3 | 1.6 | 1.3 | 9.5 |
| dimensional change percentage (%, 1400° C. × 100 h) | −0.6 | 0.00 | −0.02 | −1.0 | −0.05 | — | −1.8 |
| self-weight softening percentage (%, 1400° C. × 5 h) | 0.00 | 0.01 | 0.02 | — | 0.00 | — | — |
| thermal expansion coefficient (×10$^{-7}$/°C., RT-1400° C.) | 21 | 22 | 19 | 1 | 23 | — | — |
| melting point (°C.) | >1,700 | >1,700 | >1,700 | >1,700 | >1,700 | >1,700 | — |

TABLE 1(e)

| | Example | | | | |
|---|---|---|---|---|---|
| | 15 | 16 | 17 | 18 | 19 |
| Formulating proportions (wt %) | | | | | |
| $(ZrO)_2P_2O_7$ | 35.8 | 52.5 | | 63.1 | 49.2 |
| $ZrP_2O_7$ | 50.4 | 22.8 | 40.7 | 10.5 | 21.3 |
| $CaCO_3$ | | | | | 24.6 |
| $SrCO_3$ | 6.9 | 19.5 | 31.7 | 13.3 | |
| $BaCO_3$ | | | | | |
| $ZrO_2$ | | | | | |
| $Ca_3P_2O_8$ | | | | | |
| NiO | | | | | |
| $Y_2O_3$ | 6.9 | | | 5.0 | |
| $SiO_2$ | | 5.2 | $ZrSiO_4$ 27.6 | 8.1 | 4.9 |
| Chemical composition(mol %) | | | | | |
| $CaZr_4P_6O_{24}$ | | | | | |
| $SrZr_4P_6O_{24}$ | 50 | 83 | 67 | | |
| $BaZr_4P_6O_{24}$ | | | | | 83 |
| $NiZr_4P_6O_{24}$ | | | | | |
| $Y_{2/3}Zr_4P_6O_{24}$ | 50 | | | 75 | |
| $Sr_4Zr_4Si_6O_{24}$ | | 17 | 33 | 25 | |
| $Ba_4Zr_4Si_6O_{24}$ | | | | | 17 |
| Crystalline phase | | | | | |
| main crystalline phase | $SrZr_4P_6O_{24}$ $Y_{\frac{2}{3}}Zr_4P_6O_{24}$ solid solution | $SrZr_4P_6O_{24}$ $SrZr_4P_6O_{24}$ solid solution | $SrZr_4P_6O_{24}$ $SrZr_4P_6O_{24}$ solid solution | $Y_{2/3}Zr_4P_6O_{24}$ $SrZr_4P_6O_{24}$ solid solution | $Ba_4Zr_4P_6O_{24}$ $Ba_4Zr_4P_6O_{24}$ solid solution |
| second crystalline phase | $ZrP_2O_7$ | — | zircon | zircon | — |

TABLE 1(f)

| | Example | | | | |
|---|---|---|---|---|---|
| | 15 | 16 | 17 | 18 | 19 |
| Lattice constant of crystalline phase a (Å) | 8.70 | 8.74 | 8.77 | 8.69 | 8.69 |
| c (Å) | 23.30 | 23.34 | 23.41 | 23.32 | 24.00 |
| Firing conditions firing temperature (°C.) | 1,400 | 1,600 | 1,500 | 1,600 | 1,600 |
| keeping time (h) | 10 | 5 | 20 | 5 | 5 |
| Firing shrinkage (%) | 7.6 | 21 | 23.1 | 12.9 | 5.6 |
| Characteristics of sintered body | | | | | |
| open porosity (%) | 38.3 | 4.7 | 6.4 | 35.2 | 41.2 |
| four-point bending strength (kg/cm$^2$) | 140 | 200 | 270 | 160 | 130 |
| weight-reduced percentage (%, 1400° C. × 100 h) | 8.0 | 0.3 | 0.4 | 1.2 | 0.7 |
| dimensional change percentage (%, 1400° C. × 100 h) | −0.08 | +0.20 | −0.3 | −0.8 | −0.9 |
| self-weight softening percentage (%, 1400° C. × 5 h) | 0.24 | 0.10 | — | 0.13 | 0.26 |
| thermal expansion coefficient (×10$^{-7}$/°C., RT-1400° C.) | 37 | −20 | — | 11 | −5 |
| melting point (°C.) | >1,700 | >1,700 | — | >1,700 | >1,700 |

TABLE 1(g)

| | Example | | | | | |
|---|---|---|---|---|---|---|
| | 21 | 22 | 23 | 24 | 25 | 26 |
| Formulating proportions (wt %) | | | | | | |

TABLE 1(g)-continued

| | Example | | | | | |
|---|---|---|---|---|---|---|
| | 21 | 22 | 23 | 24 | 25 | 26 |
| $(ZrO)_2P_2O_7$ | 37.5 | 35.8 | 34.2 | 100 | | |
| $ZrP_2O_7$ | 52.8 | 50.4 | 48.1 | | | |
| $CaCO_3$ | 9.7 | | | | | |
| $SrCO_3$ | | 13.8 | | | | 40.9 |
| $BaCO_3$ | | | 17.7 | | | |
| $ZrO_2$ | | | | | 38.4 | 34.2 |
| $Ca_3P_2O_8$ | | | | | | |
| $SiO_2$ | | | | | | 24.8 |
| $NaCO_3$ | | | | | 8.1 | |
| $NH_4H_2PO_4$ | | | | | 53.5 | |
| Chemical composition (mol %) | | | | | | |
| $CaZr_4(PO_4)_6$ | 100 | | | | | |
| $SrZr_4(PO_4)_6$ | | 100 | | | | |
| $BaZr_4(PO_4)_6$ | | | 100 | | | |
| $NiZr_4(PO_4)_6$ | | | | | | |
| $Y_\frac{4}{3}Zr_4(PO_4)_6$ | | | | | | |
| $(ZrO)_2P_2O_7$ | | | | 100 | | |
| $Sr_4Zr_4Si_6O_{24}$ | | | | | 100 | |
| $Ba_4Zr_4Si_6O_{24}$ | | | | | | 100 |
| Crystalline phase | | | | | | |
| main crystalline phase | $CaZr_4P_6O_{24}$ | $SrZr_4P_6O_{24}$ | $BaZr_4P_6O_{24}$ | $(ZrO)_2P_2O_7$ | $NaZr_2P_3O_{12}$ | unknown |
| second crystalline phase | — | — | — | — | — | $m\text{-}ZrO_2$ |

TABLE 1(h)

| | Example | | | | | |
|---|---|---|---|---|---|---|
| | 21 | 22 | 23 | 24 | 25 | 26 |
| Lattice constant of crystalline phase a (Å) | 8.79 | 8.72 | 8.68 | — | — | — |
| c (Å) | 22.72 | 23.36 | 23.95 | — | — | — |
| Firing conditions firing temperature (°C.) | 1,550 | 1,600 | 1,600 | 1,600 | 1,400 | 1,400 |
| keeping time (h) | 5 | 5 | 5 | 5 | 2 | 5 |
| Firing shrinkage (%) | 14.6 | 16.2 | 10.4 | 18.5 | 13.0 | melt |
| Characteristics of sintered body | | | | | | |
| open porosity (%) | 16.1 | 17.2 | 26.5 | 4.1 | 23 | — |
| four-point bending strength (kg/cm$^2$) | 110 | 640 | 320 | 500 | 490 | — |
| weight-reduced percentage (%, 1400° C. × 100 h) | 3.0 | 0.6 | 2.4 | 18.5 | 36 | — |
| dimensional change percentage (%, 1400° C. × 100 h) | −1.8 | −0.25 | −0.2 | −1.4 | −3.0 | — |
| self-weight softening percentage (%, 1400° C. × 5 h) | 0.03 | 0.01 | 0.00 | 0.01 | 0.09 | — |
| thermal expansion coefficient (× 10$^{-7}$/°C., RT-1400° C.) | −15 | 25 | 23 | 4 | −22 | — |
| melting point (°C.) | >1,700 | >1,700 | >1,700 | >1,700 | — | — |

TABLE 2(a)

| | | Example | | | | | | |
|---|---|---|---|---|---|---|---|---|
| | | 31 | 32 | 33 | 34 | 35 | 36 | 37 |
| formulating proportions (wt. %) | $(ZrO)_2P_2O_7$ | 98.0 | 95.0 | 98.0 | 95.0 | 95.0 | 86 | 66.6 |
| | $ZrP_2O_7$ | | | | | | | 7.0 |
| | $CaCO_3$ | | | 2.0 | 5.0 | | | |
| | $SrCO_3$ | 2.0 | 5.0 | | | | | 13.3 |
| | $BaCO_3$ | | | | | 5.0 | | |
| | $ZrO_2$ | | | | | | | |
| | $Ca_3P_2O_6$ | | | | | | | |
| | $ZrSiO_4$ | | | | | | 9 | |
| | $SiO_2$ | | | | | | | 8.0 |
| | $Y_2O_3$ | | | | | | 5 | 5.1 |
| Crystalline phase (wt. %) | $CaZr_4(PO_4)_6$ | | | 20 | 47 | | | |
| | $SrZr_4(PO_4)_6$ | 13 | 32 | | | | | |
| | $BaZr_4(PO_4)_6$ | | | | | 24 | | |
| | $R_yZr_4P_{6-x}Si_xO_{24}$ solid solution | | | | | | 21 ($YZr_4P_5SiO_{24}$) | 97 ($SrY_{0.5}Zr_4P_{4.5}Si_{1.5}O_{24}$) |
| | $(ZrO)_2P_2O_7$ | 87 | 62 | 80 | 44 | 68 | 65 | |
| | $m\text{-}ZrO_2$ | | 6 | | 9 | 8 | 9 | |
| | others | | | | | | zircon 5 | zircon 3 |
| Firing conditions | fireing temperature (°C.) | 1,600 | 1,500 | 1,600 | 1,400 | 1,800 | 1,600 | 1,600 |
| | keeping time (h) | 5 | 10 | 5 | 24 | 1 | 5 | 5 |
| Firing shrinkage (%) | | 19.2 | 18.1 | 19.1 | 13.8 | 18.7 | 17.4 | 12.9 |
| Characteristics of | open porosity (%) | 2.5 | 8.1 | 3.7 | 19.5 | 3.3 | 6.7 | 35.2 |

TABLE 2(a)-continued

| | | Example | | | | | | |
|---|---|---|---|---|---|---|---|---|
| | | 31 | 32 | 33 | 34 | 35 | 36 | 37 |
| sintered body | four-point bending strength (kg/cm$^2$) | 750 | 650 | 450 | 320 | 550 | 680 | 300 |
| | weight-reduced percentage (%, 1400° C. × 100 h) | 8.6 | 6.0 | 7.0 | 6.2 | 7.2 | 8.3 | 8.6 |
| | dimensional change percentage (%, 1400° C. × 100 h) | −0.77 | −0.35 | −0.29 | −0.25 | −0.17 | −0.98 | −0.4 |
| | self-weight softening percentage (%, 1400° C. × 5 h) | — | — | — | — | — | — | — |
| | thermal expansion coefficient (× 10$^{-7}$/°C., RT-1400° C.) | 11 | — | 2 | — | 5 | — | 14 |
| | melting point (°C.) | — | >1,700 | — | — | — | — | >1,700 |

TABLE 2(b)

| | | Example | | | | | | | |
|---|---|---|---|---|---|---|---|---|---|
| | | 41 | 42 | 43 | 44 | 45 | 46 | 47 | 48 |
| Formulating proportions (wt. %) | (ZrO)$_2$P$_2$O$_7$ | 98.0 | 88 | 37.5 | 95.0 | 95.0 | 95.0 | 95.0 | 95.0 |
| | ZrP$_2$O$_7$ | | | 52.8 | | | | 5.0 | |
| | CaCO$_3$ | | | 9.7 | | | | | |
| | SrCO$_3$ | | | | | | | | |
| | BaCO$_3$ | | 2 | | | | | | |
| | ZrO$_2$ | | | | | | | | |
| | Ca$_3$P$_2$O$_6$ | | | | | | | | |
| | ZrSiO$_4$ | | | | | | | | |
| | SiO$_2$ | | | | | | SiO$_2$:5.0 | TiO$_2$:5.0 | Na$_2$CO$_3$:5.0 |
| | Y$_2$O$_3$ | | Y$_2$O$_3$:2.0 zircon 10.0 | | CeO$_2$:5.0 | | | | |
| Crystalline phase (wt. %) | CaZr$_4$(PO$_4$)$_6$ | | solid | 100 | | | | | |
| | SrZr$_4$(PO$_4$)$_6$ | | solution 8 | | | | | | |
| | BaZr$_4$(PO$_4$)$_6$ | 9 | (YZr$_4$P$_5$SiO$_{24}$) | | | | | | |
| | R$_y$Zr$_4$P$_{6-x}$Si$_x$O$_{24}$ solid solution | | 8 (YZr$_4$P$_5$SiO$_{24}$) | | | | | | 45 (Na$_2$Zr$_4$P$_6$O$_{24}$) |
| | (ZrO)$_2$P$_2$O$_7$ | 91 | 77 | | S | S | S | S | 40 |
| | m-ZrO$_2$ | | 7 | | | | | | 15 |
| | others | | zircon 8 | | CePO$_4$ | ZrP$_2$O$_7$ | TiO$_2$ | ZrP$_2$O$_7$ | |
| Firing conditions | firing temperature (°C.) | 1,600 | 1,600 | 1,350 | 1,600 | 1,600 | 1,600 | 1,600 | 1,600 |
| | keeping time (h) | 5 | 5 | 5 | 5 | 5 | 5 | 5 | 5 |
| Firing shrinkage (%) | | 19.1 | 21.0 | 12.8 | 20.2 | 18.0 | 18.2 | 19.4 | 15.0 |
| Characteristics of sintered body | open porosity (%) | 2.1 | 5.6 | 21.7 | — | — | — | — | 21.3 |
| | four-point bending strength (kg/cm$^2$) | 610 | 710 | 260 | — | — | — | — | 360 |
| | weight-reduced percentage (%, 1400° C. × 100 h) | 15.5 | 12.3 | 11.4 | 14.5 | 16.5 | 23.6 | 13.8 | 23 |
| | dimensional change percentage (%, 1400° C. × 100 h) | −1.10 | −1.00 | −5.62 | −1.14 | −1.55 | −2.67 | −1.35 | −1.20 |
| | self-weight softening percentage (%, 1400° C. × 5 h) | — | — | 0.01 | — | — | — | — | — |
| | thermal expansion coefficient (× 10$^{-7}$/°C., RT-1400° C.) | — | — | — | — | — | — | — | — |
| | melting point (°C.) | — | — | — | — | — | — | — | >1,700 |

TABLE 3

| | MgO stabilized ZrO$_2$ pebbles | Y$_2$O$_3$ stabilized ZrO$_2$ pebbles | | MgO stabilized ZrO$_2$ pebbles | Y$_2$O$_3$ stabilized ZrO$_2$ pebbles |
|---|---|---|---|---|---|
| SiO$_2$ | 0.28 | <0.05 | K$_2$O | 0.010 | <0.005 |
| Al$_2$O$_3$ | 0.037 | <0.02 | Na$_2$O | 0.047 | <0.01 |
| Fe$_2$O$_3$ | 0.14 | 0.10 | Y$_2$O$_3$ | — | 5.04 |
| TiO$_2$ | 0.12 | <0.01 | ZrO$_2$ | 94.19 | 92.90 |
| CaO | 0.29 | <0.005 | HfO$_2$ | 1.65 | 2.11 |
| MgO | 3.37 | 0.007 | Total | 100.13 | 100.16 |

TABLE 4

| | Chemical analysis values | | | | | | | | | | |
|---|---|---|---|---|---|---|---|---|---|---|---|
| | ZrO$_2$ | P$_2$O$_5$ | SiO$_2$ | Al$_2$O$_3$ | MgO | CaO | NaKO | Ig loss | Fe$_2$O$_3$ | SrO | BaO |
| (ZrO)$_2$P$_2$O$_7$ | 61.85 | 36.38 | <0.2 | 0.01 | 0.45 | 0.02 | 0.01 | 3.20 | <0.01 | — | — |
| ZrP$_2$O$_7$ | 46.44 | 52.24 | 0.02 | <0.01 | <0.01 | <0.01 | <0.01 | 2.86 | <0.01 | — | — |
| CaCO$_3$ | — | — | — | — | — | 55.72 | <0.01 | 43.78 | <0.01 | — | — |
| SrCO$_3$ | — | — | 0.001 | <0.001 | 0.001 | 0.11 | 0.012 | 30.15 | 0.018 | 69.61 | — |
| BaCO$_3$ | — | — | — | — | — | — | | 22.30 | <0.01 | — | 76.50 |
| CeO$_2$ | — | — | 0.01 | 0.001 | <0.001 | 0.005 | — | 0.06 | <0.001 | — | — |
| SiO$_2$ | — | — | 99.68 | 0.07 | 0.018 | <0.002 | 0.005 | 0.07 | 0.038 | — | — |

TABLE 4-continued

| | | | | | | | | | | | |
|---|---|---|---|---|---|---|---|---|---|---|---|
| TiO$_2$ | — | — | 0.07 | 2.10 | <0.01 | <0.01 | <0.01 | 0.66 | <0.01 | — | — |
| Ca$_3$(PO$_4$)$_2$ | — | 45.53 | 0.01 | 0.02 | — | 53.97 | 0.01 | 0.10 | <0.01 | — | — |
| ZrO$_2$ | 98.65 | — | 0.06 | 0.01 | 0.01 | 0.04 | 0.02 | 0.38 | <0.01 | — | — |
| Y$_2$O$_3$ | — | — | <0.01 | — | — | <0.01 | — | — | <0.01 | — | — |
| ZrSiO$_4$ | 66.63 | — | 32.62 | 0.35 | 0.002 | 0.001 | 0.06 | 0.21 | 0.054 | — | — |
| Na$_2$CO$_3$ | — | — | — | — | — | — | Na$_2$O 58.47 | 41.51 | <0.0005 | — | — |
| NH$_4$H$_2$PO$_4$ | — | 61.08 | — | — | — | — | — | 37.92 | — | — | — |
| NiO | — | — | — | — | — | — | — | 0.2 | — | — | — |

| | Chemical analysis values | | | | | Average particle size |
|---|---|---|---|---|---|---|
| | CeO$_2$ | Gd$_2$O$_3$ | TiO$_2$ | Y$_2$O$_3$ | NiO | (μm) |
| (ZrO)$_2$P$_2$O$_7$ | — | — | — | — | — | 0.9 |
| ZrP$_2$O$_7$ | — | — | — | — | — | 1.0 |
| CaCO$_3$ | — | — | — | — | — | 2.2 |
| SrCO$_3$ | — | — | — | — | — | 0.6 |
| BaCO$_3$ | — | — | — | — | — | 10.0 |
| CeO$_2$ | 99.62 | — | — | — | — | 1.6 |
| SiO$_2$ | — | — | 0.004 | — | — | 1.0 |
| TiO$_2$ | — | — | 97.09 | — | — | <1.0 |
| Ca$_3$(PO$_4$)$_2$ | — | — | — | — | — | 2.0 |
| ZrO$_2$ | — | — | 0.15 | — | — | 0.9 |
| Y$_2$O$_3$ | — | — | — | >99.9 | — | 1.0 |
| ZrSiO$_4$ | — | — | 0.095 | — | — | 1.0 |
| Na$_2$CO$_3$ | — | — | — | — | — | 10 |
| NH$_4$H$_2$PO$_4$ | — | — | — | — | — | 20 |
| NiO | — | — | — | — | 99 | 0.8 |

As seen from the results of Examples 1–19 and Comparative Examples 21–26 in Table 1, the solid solution of R$_y$Zr$_4$Si$_x$P$_{6-x}$O$_{24}$ system according to the invention and the heat-resistant sintered body comprising the above solid solution are obtained when R is at least one bivalent or trivalent element and x is a numerical value of 0–2. Further, the solid solution and sintered body are obtained by sintering a batch mixture of materials selected from ZrP$_2$O$_7$, (ZrO)$_2$P$_2$O$_7$, ZrO$_2$, Zr(OH)$_4$, ZrSiO$_4$, SiO$_2$, a phosphate of R, a silicate of R and RO (R is at least one bivalent or trivalent element) under firing conditions shown in Table 1.

Figure 2:
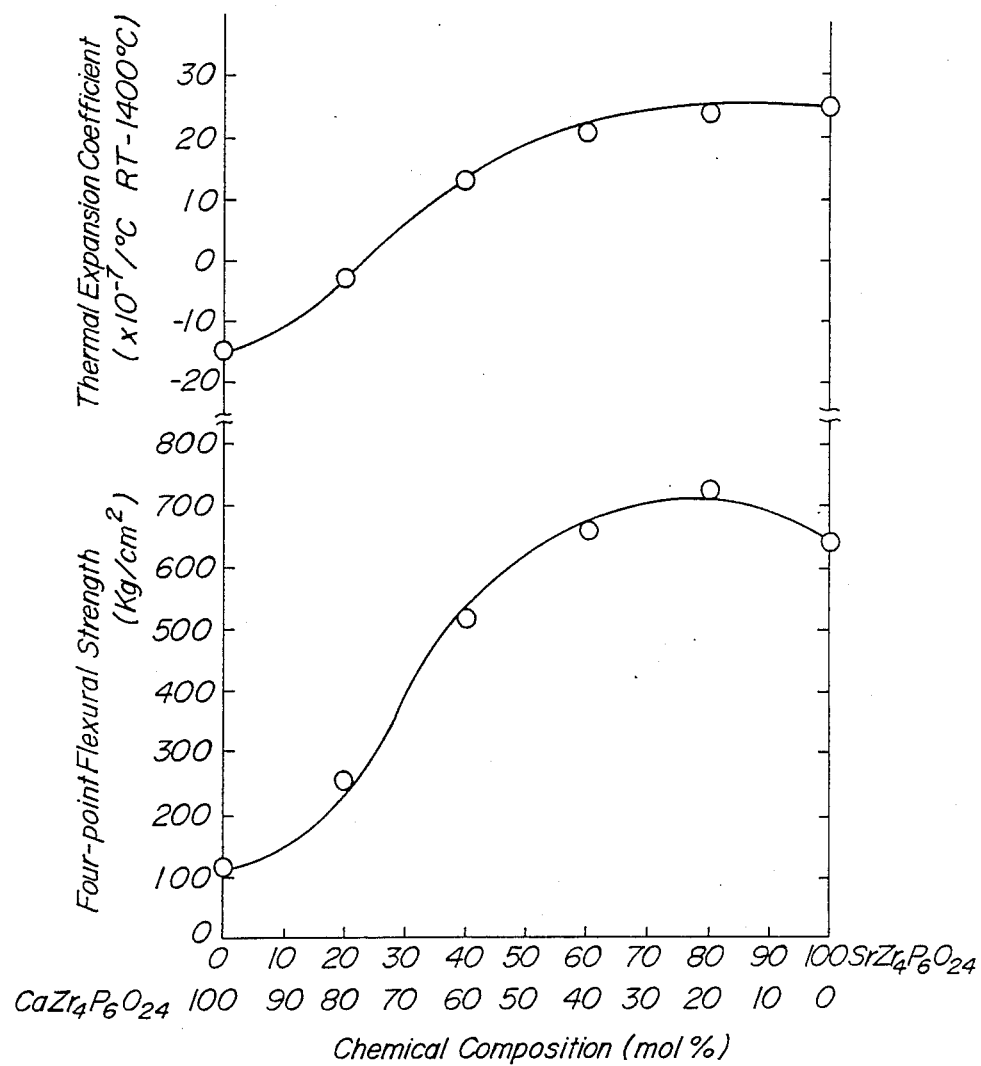
FIG. 2 is a graph showing a relationship among chemical composition in a sintered body composed of a solid solution of the $CaZr_4P_6O_{24}$—$SrZr_4P_6O_{24}$ system, thermal expansion coefficient within a range of room temperature to 1,400° C. and four-point flexural strength.
Figure 3:
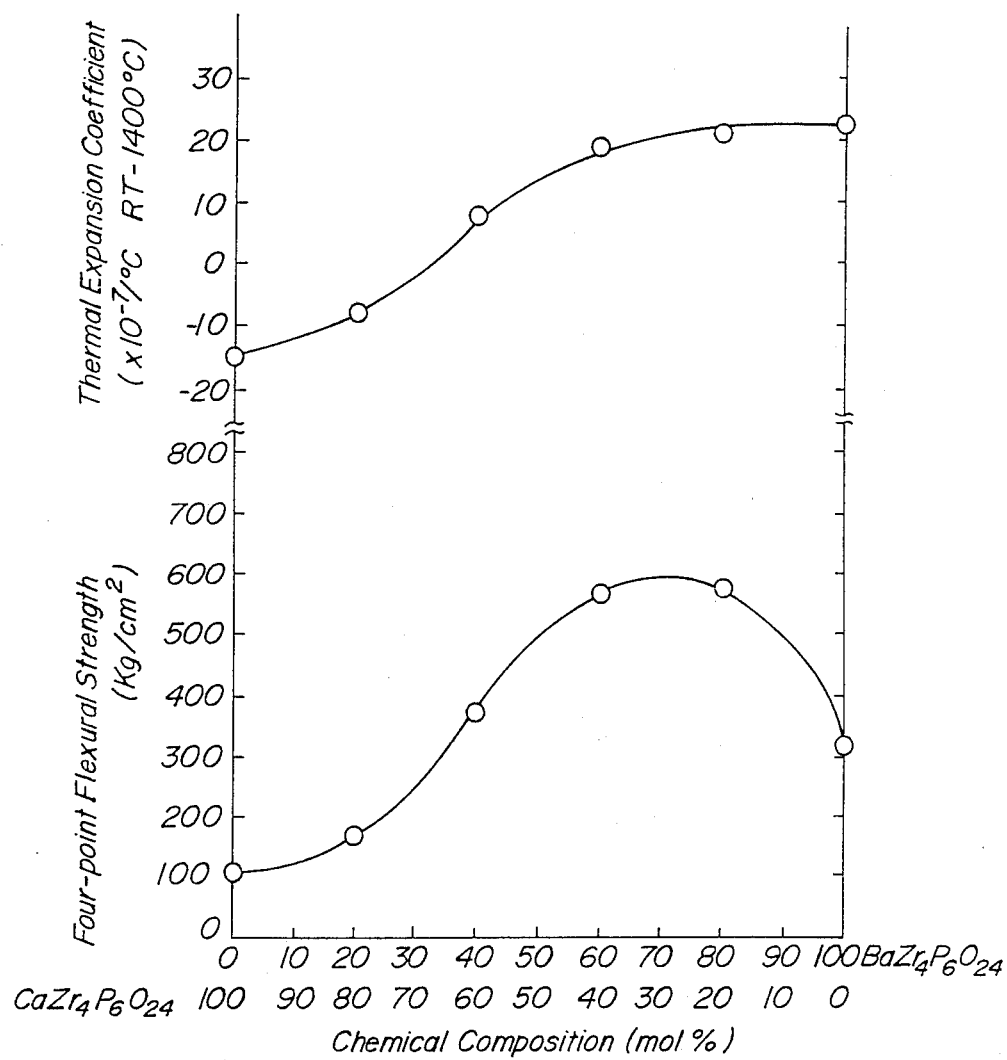
FIG. 3 is a graph showing a relationship among chemical composition in a sintered body composed of a solid solution of the $CaZr_4P_6O_{24}$—$BaZr_4P_6O_{24}$ system, thermal expansion coefficient within a range of room temperature to 1,400° C. and four-point flexural strength.
Figure 4:
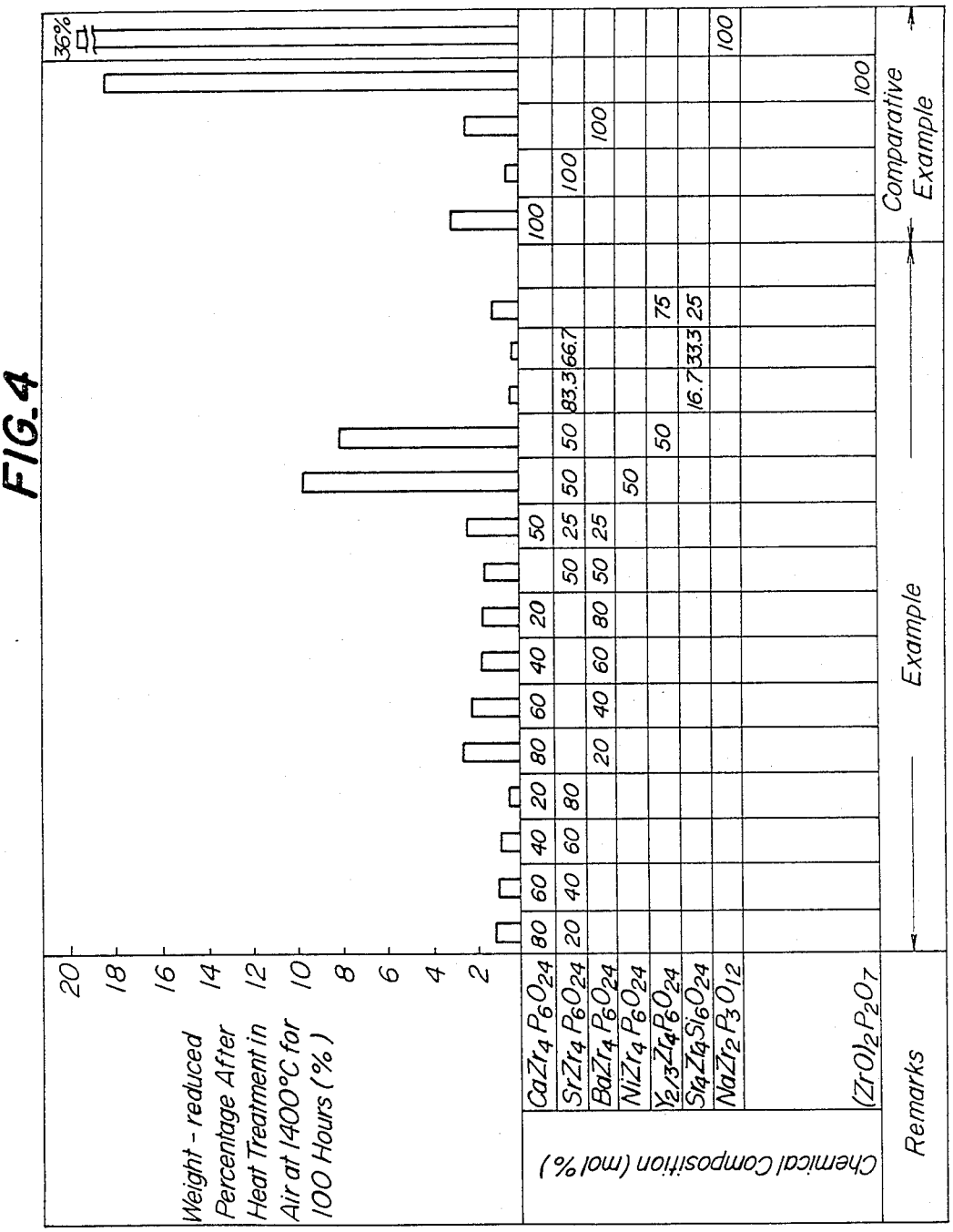
FIG. 4 is a bar chart showing the weight-reduced percentage in Examples 1–10 and 14–18 and Comparative Examples 21–25 after heat treatment at 1,400° C. for 100 hours.
Figure 5:
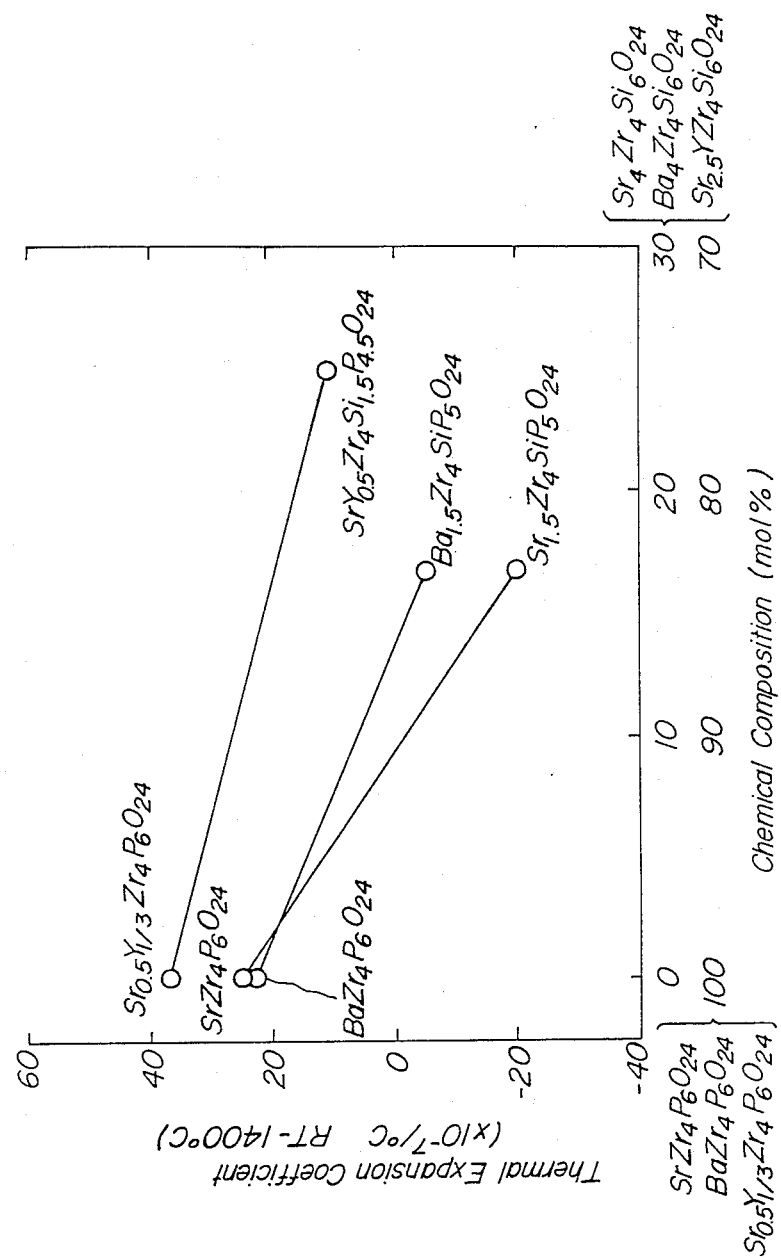
FIG. 5 is a graph showing a relationship between chemical composition of a sintered body composed of a solid solution of the $R_yZr_4Si_xP_{6-x}O_{24}$ system and thermal expansion coefficient over a temperature range of room temperature to 1,400° C.

In FIG. 1 is shown a relationship between chemical composition and lattice constant in solid solutions of the CaZr$_4$P$_6$O$_{24}$—SrZr$_4$P$_6$O$_{24}$ system and the CaZr$_4$P$_6$O$_{24}$—BaZr$_4$P$_6$O$_{24}$ system. FIG. 2 shows a relationship among chemical composition in a solid solution of the CaZr$_4$P$_6$O$_{24}$—SrZr$_4$P$_6$O$_{24}$ system, and thermal expansion coefficient and four-point flexural strength of a sintered body thereof. FIG. 3 shows a relationship among chemical composition in a solid solution of the CaZr$_4$P$_6$O$_{24}$—BaZr$_4$P$_6$O$_{24}$ system, and thermal expansion coefficient and four-point flexural strength of a sintered body thereof. FIG. 4 shows a relationship between chemical composition in a solid solution of the R$_y$Zr$_4$Si$_x$P$_{6-x}$O$_{24}$ system and a weight-reduced percentage when a sintered body comprising this solid solution is held at 1,400° C. for 100 hours. FIG. 5 shows a relationship between chemical composition in a solid solution of the R$_y$Zr$_4$Si$_x$P$_{6-x}$O$_{24}$ system and a thermal expansion coefficient of a sintered body comprising this solid solution.

As seen from the above, when R is at least one bivalent or trivalent element, the heat resistance and high temperature stability of the crystalline phase are excellent, and further the characteristics of solid solution of R$_y$Zr$_4$P$_6$O$_{24}$ ($\frac{2}{3} \leq y \leq 1$) itself can be maintained through solid solubilization. Additionally, high strength and low expansion sintered bodies having excellent heat resistance and high temperature stability can be obtained.

In addition, the solid solution wherein a part of the P ion is simultaneously replaced with an Sr ion and an R ion is more excellent in the high temperature stability and the characteristic of the solid solution of the R$_y$Zr$_4$Si$_x$P$_{6-x}$O$_{24}$ system itself can be controlled, whereby the heat-resistant sintered bodies having a further improved high temperature stability, a high strength and a low expansion are obtained.

Figure 6:
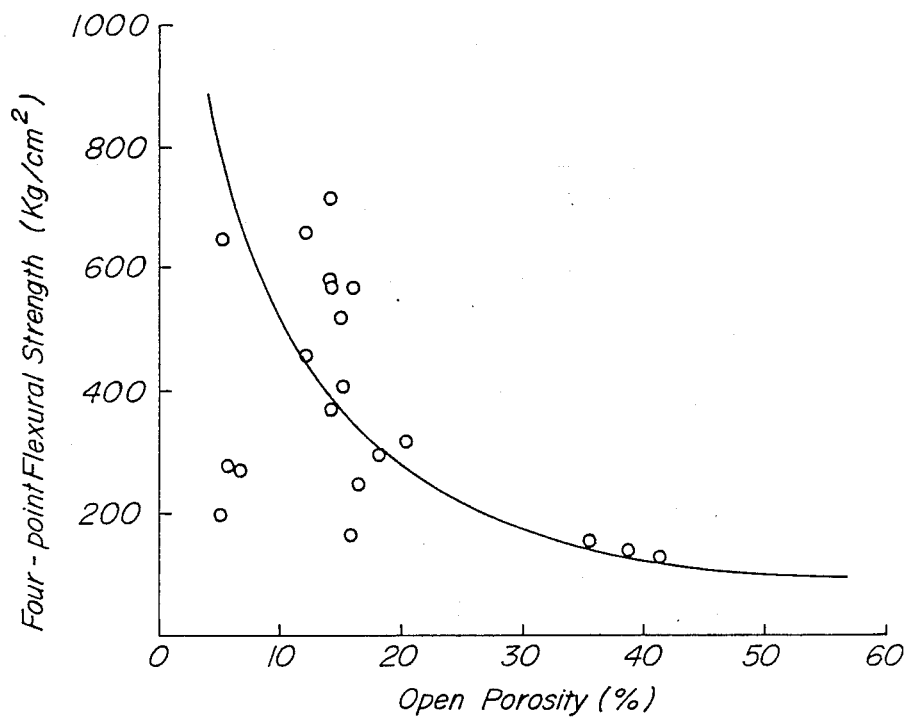
FIG. 6 is a graph showing a relation between open porosity and four-point flexural strength in the sintered body composed of a solid solution of $R_yZr_4Si_xP_{6-x}O_{24}$ system.

Further, FIG. 6 shows a relationship between open porosity and four-point flexural strength in the sintered body comprising a solid solution of the R$_y$Zr$_4$Si$_x$P$_{6-x}$O$_{24}$ system.

Figure 7:
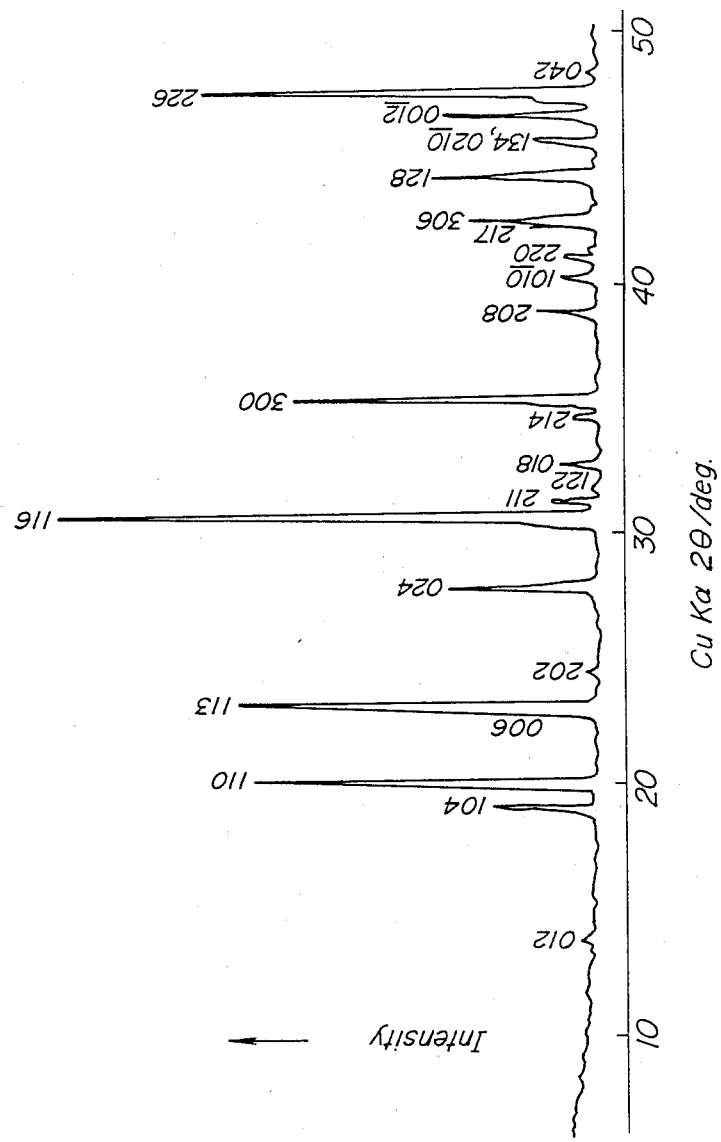
FIG. 7 is a graph showing a powder X-ray diffraction pattern at room temperature in Example 16.

Moreover, FIG. 7 shows a powder X-ray diffraction pattern of the sintered body in Example 16 at room temperature, which indicates that the sintered body consists of only the solid solution of Sr$_{1.5}$Zr$_4$SiP$_6$O$_{24}$.

Figure 8:
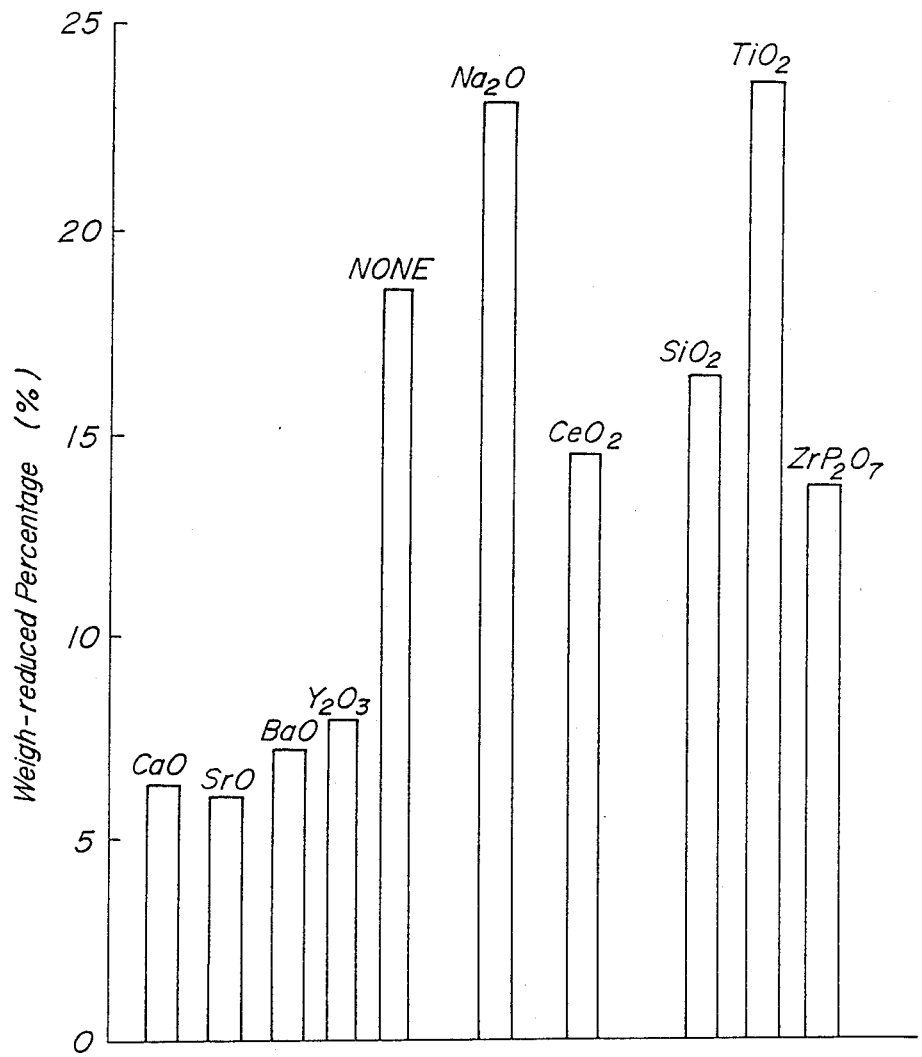
FIG. 8 is a graph showing a weight-reduced percentage in the heat treatment at 1,400° C. for 100 hours when various additives are added to the phosphate based compound sintered body.
Figure 9:
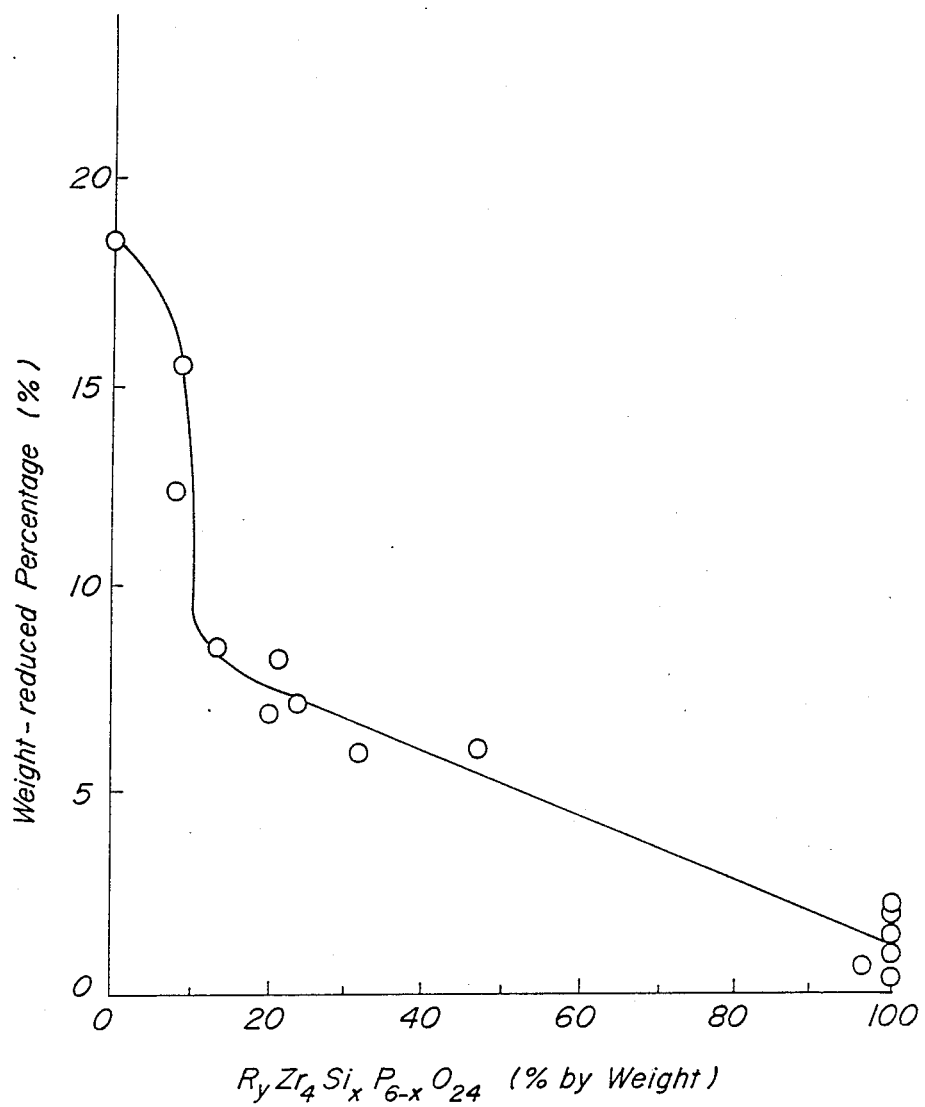
FIG. 9 is a graph showing a relationship between amount of $R_yZr_4Si_xP_{6-x}O_{24}$ crystalline phase in the phosphate based compound sintered body and weight-reduced percentage in the heat treatment at 1,400° C. for 100 hours.

As seen from the results of Examples 2, 6, 9, 10, 16 and Comparative Examples 21–24 in Table 1 and Examples 31–37 and Comparative Examples 41–48 in Table 2, when R$_y$Zr$_4$Si$_x$P$_{6-x}$O$_{24}$ (R is at least one capable of forming bivalent or trivalent element) is contained in an amount of not less than 10% by weight as a crystalline phase, the phosphate based compound sintered bodies having a weight-reduced percentage of not more than 10% after heat treatment at 1,400° C. for 100 hours according to the invention are obtained. Further, such sintered bodies are obtained by sintering a batch mixture of materials selected from ZrP$_2$O$_7$, (ZrO)$_2$P$_2$O$_7$, ZrO$_2$, ZrSiO$_4$, SiO$_2$, a phosphate of R, a silicate of R and RO under firing conditions shown in Tables 1 and 2. FIG. 8 shows a weight-reduced percentage when various additives are added to the phosphate compound. FIG. 9 shows a relationship between weight percentage of R$_y$Zr$_4$Si$_x$P$_{6-x}$O$_{24}$ system contained in the phosphate compound and weight-reduced percentage of the sintered body. FIG. 10 shows a relation between weight percentage of R$_y$Zr$_4$Si$_x$P$_{6-x}$O$_{24}$ crystalline phase and dimensional change percentage in the phosphate based compound sintered body.

As seen from the above, when not less than 10% by weight of the R$_y$Zr$_4$Si$_x$P$_{6-x}$O$_{24}$ crystalline phase is included into the phosphate based compound sintered body, the weight-reduced percentage and dimensional change percentage after the heat treatment in air at 1,400° C. for 100 hours are considerably small and the heat resistance is excellent in the phosphate based compound sintered body.

Furthermore, FIG. 11 shows a relationship between open porosity and four-point flexural strength in the phosphate based compound sintered body.

Moreover, FIG. 12 shows an X-ray diffraction pattern of the phosphate based compound sintered body in Example 33, from which it is apparent that the sintered body contains $(ZrO)_2P_2O_7$ and $CaZr_4(PO_4)_6$ as a crystalline phase.

As mentioned above, according to the invention, there can be obtained a solid solution of the $R_yZr_4Si_xP_{6-x}O_{24}$ system (where R is at least one bivalent or trivalent element, and x is a numerical value of 0–2 and y is a numerical value of $\frac{2}{3}$–2 satisfying an electrically neutral condition of the chemical formula), and a heat-resistant sintered body comprising the above solid solution and having high strength, low expansion and excellent high temperature stability, and a heat-resistant phosphate based compound sintered body containing not less than 10% by weight of the above solid solution and having a weight-reduced percentage of not more than 10% after the heat treatment at 1,400° C. for 100 hours.

Therefore, the solid solution of the $R_yZr_4Si_xP_{6-x}O_{24}$ system, and the heat-resistant sintered body and phosphate based compound sintered body comprising this solid solution can widely be applied to articles requiring high heat resistance, low expansion and high temperature stability, such as rotary heat regenerating type ceramic heat exchangers and heat recuperative type ceramic heat exchangers when being molded into a honeycomb structural body through extrusion molding, and diesel particulate filters, and housings for ceramic turbocharger rotor or heat insulating materials for engine manifold when being molded through slip casting, pressing, injection molding or the like.

What is claimed is:

1. A solid solution having a composition of $R_yZr_4Si_xP_{6-x}O_{24}$, wherein R is at least one bivalent or trivalent element, x is a numerical value of greater than 0 but not greater than 2, and y is a numerical value of $\frac{2}{3}$ to 2 satisfying an electrically neutral condition of the chemical formula.

2. A heat-resistant sintered body consisting essentially of a solid solution of the $R_yZr_4Si_xP_{6-x}O_{24}$ system, wherein R is at least one bivalent or trivalent element, x is a numerical value of greater than 0 but not greater than 2, and y is a numerical value of $\frac{2}{3}$ to 2 satisfying an electrically neutral condition of the chemical formula; wherein said sintered body has a self-weight softening percentage of not more than 0.3% after a heat treatment at 1400° C. for 5 hours.

3. A heat-resistant phosphate based compound sintered body consisting essentially of
at least 10% by weight of a solid solution of the $R_yZr_4Si_xP_{6-x}O_{24}$ system, wherein R is at least one bivalent or trivalent element, x is a numerical value of 0 to 2, and y is a numerical value of $\frac{2}{3}$ to 2 satisfying an electrically neutral condition of the chemical formula; and
zirconyl phosphate $(Zr_2P_2O_9)$;
wherein said sintered body has a weight-reduced percentage of not more than 10% after a heat treatment at 1400° C. for 100 hours and a self-weight softening percentage of not more than 0.3% after a heat treatment at 1400° C. for 5 hours.

4. A method of producing a heat-resistant sintered body, comprising:
molding a batch mixture selected from the group consisting of: (A) $ZrP_2O_7$, $Zr_2P_2O_9$, and/or $ZrO_2$, $SiO_2$ or a compound thereof, and one or more RO and/or a phosphate of R; (B) $ZrP_2O_7$, $Zr_2P_2O_9$, $SiO_2$ and one or more RO; and (C) $ZrP_2O_7$, $ZrSiO_4$ and one or more RO; wherein R includes one or more bivalent or trivalent elements; and
firing the molded batch mixture at a temperature of not lower than 1400° C. in air to precipitate a solid solution of the $R_yZr_4Si_xP_{6-x}O_{24}$ system as a main crystalline phase of the sintered body, wherein R is said at least one bivalent or trivalent element, x is a numerical value of greater than 0 but not greater than 2, and y is a numerical value of $\frac{2}{3}$ to 2 satisfying an electrically neutral condition of the chemical formula.

5. A method of producing a heat-resistant phosphate based compound sintered body, comprising:
molding a batch mixture of $Zr_2P_2O_9$, $ZrSiO_4$ and one or more RO, wherein R includes one or more bivalent or trivalent elements;
firing the molded batch mixture at 1500°–1600° C. in air to form a sintered body consisting essentially of at least 10% by weight of a solid solution of the $R_yZr_4Si_xP_{6-x}O_{24}$ system and zirconyl phosphate $(Zr_2P_2O_9)$, wherein R is said at least one bivalent or trivalent element, x is a numerical value of 0 to 2, and y is a numerical value of $\frac{2}{3}$ to 2 satisfying an electrically neutral condition of the chemical formula.

6. The method of claim 4, wherein said firing is carried out at a temperature of 1400°–1800° C. for a time of 1 to 24 hours.

7. The method of claim 4, wherein said R is at least one element selected from the group consisting of Ca, Sr, Ba, Y and Ni.

8. The method of claim 5, wherein said R is at least one element selected from the group consisting of Ca, Sr, Ba, Y and Ni.

* * * * *